(12) United States Patent
Arnold et al.

(10) Patent No.: US 7,028,162 B2
(45) Date of Patent: Apr. 11, 2006

(54) CONFIGURABLE PROCESSING BLOCK CAPABLE OF INTERACTING WITH EXTERNAL HARDWARE

(75) Inventors: Ralf Arnold, Poing (DE); Helge Kleve, Geisenfeld (DE); Christian Siemers, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 611 days.

(21) Appl. No.: 09/816,926

(22) Filed: Mar. 23, 2001

(65) Prior Publication Data

US 2002/0013891 A1 Jan. 31, 2002

Related U.S. Application Data

(63) Continuation of application No. PCT/DE99/02891, filed on Sep. 10, 1999.

(30) Foreign Application Priority Data

Sep. 23, 1998 (DE) ................................ 198 43 663

(51) Int. Cl.
*G06F 15/177* (2006.01)
*G06F 13/00* (2006.01)

(52) U.S. Cl. ........................................................ 712/32
(58) Field of Classification Search ................ 712/37, 712/33, 30, 32
See application file for complete search history.

(56) References Cited

U.S. PATENT DOCUMENTS

| | | | |
|---|---|---|---|
| 4,760,518 A * | 7/1988 | Potash et al. ................ 710/107 |
| 5,361,373 A | 11/1994 | Gilson ............................. 712/1 |
| 5,377,129 A * | 12/1994 | Molvig et al. .................. 703/9 |
| 5,603,047 A * | 2/1997 | Caulk, Jr. ...................... 712/23 |
| 5,748,635 A * | 5/1998 | Thomann et al. ........... 370/465 |
| 5,784,636 A | 7/1998 | Rupp ........................... 712/37 |
| 5,794,062 A | 8/1998 | Baxter .......................... 712/30 |
| 5,796,623 A * | 8/1998 | Butts et al. ................... 703/23 |
| 5,870,619 A * | 2/1999 | Wilkinson et al. ........... 712/20 |
| 6,023,742 A * | 2/2000 | Ebeling et al. ............. 710/107 |
| 6,061,367 A | 5/2000 | Siemers ....................... 712/33 |
| 6,077,315 A * | 6/2000 | Greenbaum et al. ........ 717/157 |
| 6,152,613 A * | 11/2000 | Martin et al. ................. 712/33 |
| 6,163,836 A * | 12/2000 | Dowling ...................... 712/37 |
| 6,658,550 B1 * | 12/2003 | Martin et al. ................. 712/23 |

FOREIGN PATENT DOCUMENTS

| DE | 196 14 991 A1 * | 10/1996 |
|---|---|---|
| DE | 197 22 365 A1 * | 12/1997 |
| EP | 637173 A3 * | 4/1995 |
| EP | 0 825 540 A1 * | 2/1998 |
| WO | 97/07466 | 2/1997 |

OTHER PUBLICATIONS

Andre DeHone; Transit Note #118 Notes on Coupling Processors with Reconfigurable Logic; Mar. 1995; p. 23.*

(Continued)

*Primary Examiner*—Eric Coleman
(74) *Attorney, Agent, or Firm*—Laurence A. Greenberg; Werner H. Stemer; Ralph E. Locher (57) ABSTRACT

The configurable hardware block is designed to read data stored in a memory according to its configuration, to process the read-out data arithmetically and/or logically and to write the data representing the result of the processing into the memory. The hardware block is capable of interacting with external hardware, thereby providing a flexible and universally applicable hardware block.

25 Claims, 3 Drawing Sheets

OTHER PUBLICATIONS

John L Hennessy and David A Patterson; Computer Organization and Design The Hardware/Software Interface; Morgan Kaufman Publishers; 1998; pp. 351 and B-9.*

The American College Dictionary, 2002, Houghton Mifflin Company, 4th Edition, pp. 365 and 1424.*

* cited by examiner

CONFIGURABLE PROCESSING BLOCK CAPABLE OF INTERACTING WITH EXTERNAL HARDWARE

CROSS-REFERENCE TO RELATED APPLICATION

This application is a continuation of copending International Application No. PCT/DE99/02891, filed Sep. 10, 1999, which designated the United States.

BACKGROUND OF THE INVENTION

Field of the Invention

The invention lies in the computing technology field and pertains, more specifically, to a configurable hardware block, which is designed, depending on its configuration, to read the data stored in a memory unit, process the data arithmetically and/or logically, and write the data representing the result of the processing operation to the memory unit.

Configurable hardware blocks have been available for quite some time in many different implementation formats. These include so-called field-programmable logic components such as PALs (programmable array logic), GALs (generic array logic), etc.

Configurable hardware blocks can also be used in program-controlled units, and their use in so-called >S<puters is well documented.

Until recently, all program-controlled units (microprocessors, microcontrollers, etc.) were designed in accordance with the famous Von-Neumann model. Although the provision of separate memory areas for code and data was generally rejected (in the Harvard model, for example), the execution of instructions (and of associated actions or operations) is still almost exclusively purely sequential, even today.

The sequential processing of instructions restricts the maximum speed at which instructions can be processed.

Particularly high speeds can be achieved with so-called RISC processors. These processors have a reduced instruction set, and allow the use of hard-wired hardware to replace microprograms, in which the instructions to be processed are normally decoded and executed. This, in turn, allows the implementation of particularly fast and efficient instruction pipelines and instruction execution units, so that it is possible to execute an average of up to one instruction per processor cycle. However, even with RISC processors, it is not possible to execute more than one instruction per processor cycle due to the sequential nature of both processing and results that continues to apply.

The aforementioned >S<puter is a program-controlled unit that can process more than one instruction per processor cycle. European published patent application EP 0 825 540 A1 and U.S. Pat. No. 6,061,367 describe an exemplary embodiment of one such >S<puter.

Figure 3:
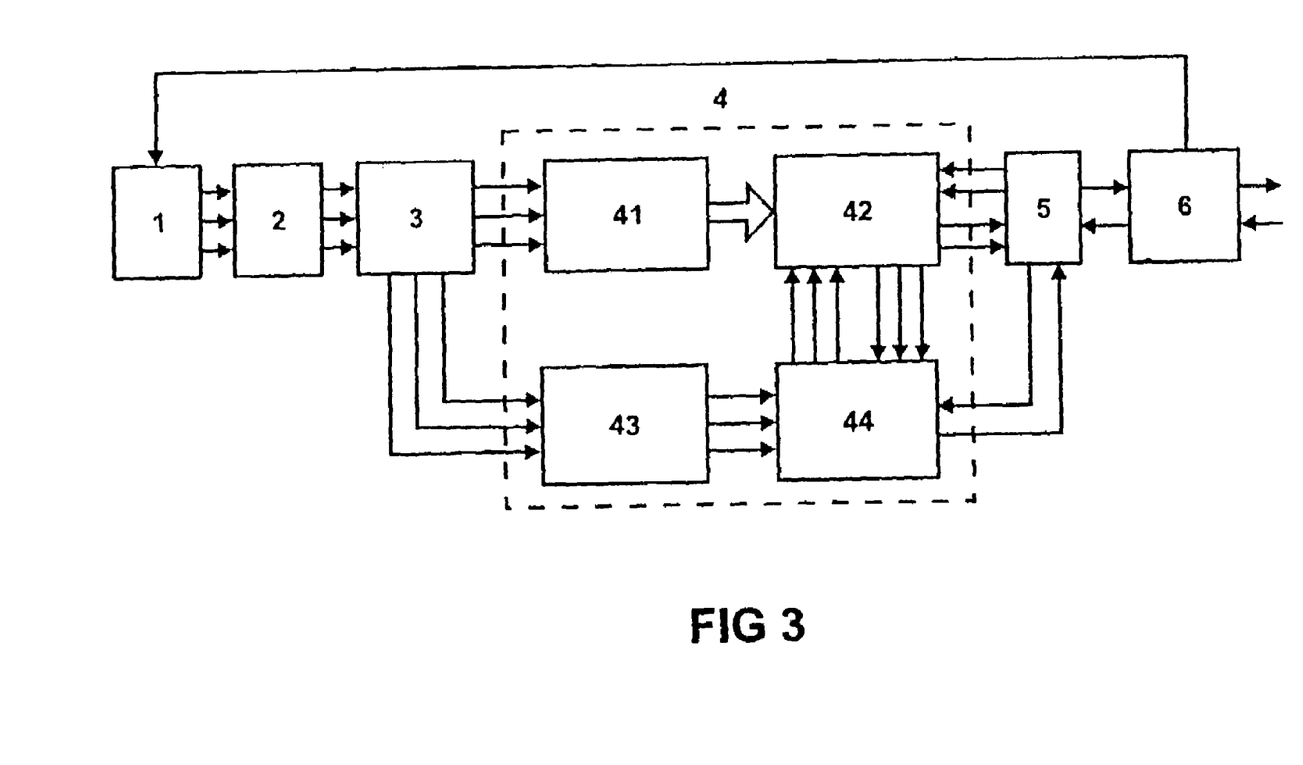
FIG. 3 is a block diagram of the underlying structure of an >S<puter.

The basic structure of an >S<puter is shown in FIG. 3, which is used as a reference for the following description.

For the sake of completeness, it should be noted at this point that the >S<puter, and in particular the part that processes the instructions, is only partially shown and described here (only to the extent required to illustrate the configurable hardware blocks currently under consideration).

Referring now more specifically to FIG. 3, the >S<puter includes a predecode unit (1), an instruction buffer (2), a decode, rename & load unit (3), an s-unit (4), a data cache (5), and a memory interface (6). The s-unit (4) comprises a programmable structure buffer (41), a functional unit with programmable structure (42), an integer/address instruction buffer (43), and an integer register file (44).

The special characteristic of the >S<puter is its s-unit (4), and specifically the functional unit (42) of the s-unit (4). The functional unit (42) is hardware that can be structured, i.e. based on the instructions or instruction sequences to be executed by the >S<puter, it can be dynamically configured to execute the actions or operations specified by the instructions or instruction sequences.

Instructions (more accurately code data representing these instructions) to be executed on the >S<puter arrive from a non-illustrated memory, via the memory interface (6), at the predecode unit (1), where they are predecoded. At the same time, the code data can be supplemented with information, for example, to facilitate subsequent decoding in the decode, rename & load unit (3). The code data then arrive via the instruction buffer (2) at the decode, rename & load unit (3), where the execution of instructions represented by the code data is prepared. This preparation includes decoding the code data, configuring or structuring the functional unit (42), initializing or managing the integer register file (44), and starting the functional unit (42), which has been configured as required.

The functional unit (42) is structured or configured using the configuration data that represent the required configuration and are written to the programmable structure buffer (41) by the decode, rename & load unit (3). The configuration data that represent the required configuration are created in the decode, rename & load unit (3). However, it may also be already included in the code data in encoded format.

The functional unit (42) is configured to read data from the register file (44) and/or data cache (5), to process the read data arithmetically and/or logically, and to write the data representing the result of the processing to the register file (44) and/or the data cache (5). The functional unit (42) is therefore a "configurable hardware block" as the term is understood herein and to which the appended claims are drawn.

When the register file (44) is initialized as appropriate and the functional unit (42) is configured as appropriate, use of the functional unit (42) causes actions or operations to be performed, where these actions or operations are to be effected by executing the instructions that provided the basis for initialization of the register file (44) and configuration of the functional unit (42).

The use of appropriately configured hardware (functional unit 42), to perform actions that are to be achieved by the execution of instructions, is known to be significantly faster than executing instructions in "normal" arithmetic/logic units (ALUs) using conventional program-controlled units. This is particularly true if the hardware (functional unit 42) is configured in such a way that it can be used to achieve a result that corresponds to the execution of a number of sequential instructions (a macroinstruction containing a number of instructions).

For further details about the structure, function, and operation of >S<puters, reference is had to the above-mentioned European patent application EP 0 825 540 A1 and U.S. Pat. No. 6,061,367, which is herewith incorporated by reference.

For the sake of completeness, it should be noted that the functional unit (42) cannot execute all the actions that are to be achieved by the instructions executed on the >S<puter. In particular, instructions used for program-execution control or flow control (e.g. branch, jump, no-operation, wait, and stop) are generally executed in the conventional manner.

Nevertheless, the use of configurable hardware blocks such as the functional unit (42) generally allows the execution of a greater number of actions that have to be effected by executing instructions, per time unit, than is possible with conventional program-controlled units. It is therefore possible to process more than one instruction per processor cycle.

However, there are also applications in which it is not possible, by providing hardware blocks of the type described above, to increase the number of actions that can be executed per time unit.

SUMMARY OF THE INVENTION

The object of the present invention is to provide a configurable hardware block which overcomes the above-noted deficiencies and disadvantages of the prior art devices and methods of this general kind, and which hardware block is enhanced as it is more flexible and/or more suitable for universal use than was previously the case.

With the above and other objects in view there is provided, in accordance with the invention, an improved configurable hardware block, of the type which, depending on its configuration, is enabled to read data stored in a memory unit, process the data arithmetically and/or logically, and write data representing a result of the processing to the memory unit. The improvement is found in the fact that the hardware block is enabled to interact with external hardware.

This improves the performance characteristics and expands the scope of the hardware block. The hardware block is therefore more flexible and more suitable for universal use than conventional hardware blocks of the type under consideration.

In accordance with an added feature of the invention, the hardware block is configured for interaction with the external hardware wherein the memory unit is instructed to accept data supplied by the external hardware in response to specific events.

In accordance with an additional feature of the invention, the hardware block is configured for interaction with the external hardware which includes outputting data and/or signals to the external hardware.

In accordance with another feature of the invention, the external hardware may be other configurable hardware blocks, and/or a control unit operating in parallel or at a supervisory level, and/or other components of a system containing the configurable hardware block.

In accordance with a further feature of the invention, the data and/or signals output to the external hardware are used to signal specific states or events.

In accordance with again an added feature of the invention, there is provided a timer generation unit generating a clock signal for the memory unit. In a preferred embodiment of the invention, the timer generation unit is configured to generate the clock signal depending on one or more periodic or non-periodic signals originating at least to some extent from the external hardware.

In accordance with again an additional feature of the invention, there is provided a signaling unit configured to generate report signals for the external hardware. Preferably, the report signals signal an occurrence of predefined states and/or events in the configurable hardware block. Further, the signaling unit may be configured to generate a report signal signaling that an operation or sequence of operations to be executed repeatedly in the hardware block has been executed a specified number of times. In another mode, the signaling unit is configured to generate a report signal useable as an interrupt request for a program-controlled unit. It is also possible for the at least one comparison unit to generate and output a report signal.

In accordance with again another feature of the invention, at least some of the comparison units are configurable comparison units configured to subject incoming signals to operations such as selectable compare operations, checks for TRUE, and checks for UNTRUE.

In accordance with yet an added feature of the invention, the selectable compare operations are, for example, greater than, greater than or equal to, not equal to, smaller than, and smaller than or equal to comparisons.

In accordance with yet an additional feature of the invention, at least some of the comparison units have a multiplexer series-connected on an input side thereof, the multiplexer determining which signals are supplied to the comparison unit as input signals.

In accordance with yet another feature of the invention, there are provided a plurality of configurable sub-units configurable to a required function, and/or configurable data paths, and/or configurable signal paths.

In accordance with yet a further feature of the invention, configurable data and signal paths to the external hardware exist or can be established.

In accordance with yet again an added feature of the invention, the memory unit is a register block containing a plurality of registers.

In accordance with yet again an additional feature of the invention, the hardware block is configurable on a basis of instructions or instruction sequences, and configurable to execute operations or operation sequences specified by the instructions or instruction sequences. In a preferred embodiment, the configurable hardware block is dimensioned to be configurable by hyperblock.

In accordance with yet an added feature of the invention, the configurable hardware block is constructed and configurable to be used to replace a specific circuit or various specific circuits.

In accordance with yet again another feature of the invention, the configurable hardware block is configured to test an integrated circuit containing the hardware block. Alternatively, the hardware block is configurable for use in cryptography and/or identification applications.

In accordance with a concomitant feature of the invention, the configurable hardware block includes a memory unit for storing interim results.

Other features which are considered as characteristic for the invention are set forth in the appended claims.

Although the invention is illustrated and described herein as embodied in a configurable hardware block, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The hardware block discussed in detail below is a configurable hardware block, which is designed, depending on its configuration, to read the data stored in a memory unit, process the data arithmetically and/or logically, and write the data representing the result of this processing to the memory unit. It can also be designed to interact autonomously with external hardware. It is therefore a hardware block that can be used both within program-controlled units (as a functional unit in an >S<puter, for example) or other equipment, and as a standalone unit (independent of any control units operating in parallel or at a supervisory level), offering flexibility and universal use. It will therefore be referred to as a UCB (universal configurable block) in the following text.

The memory unit, from which the UCB reads data and to which the UCB writes data, can be provided inside or outside the UCB. In the example shown here, the memory unit is represented by the register file (44) of the >S<puter illustrated in FIG. 3 and described in the introductory text above.

UCB read and write accesses to the memory unit should preferably be timed. The UCB itself is an asynchronous combinational circuit between the inputs and outputs of the memory unit. The components of the UCB are linked together asynchronously.

Preferably, it should be possible to initialize the memory unit from outside the UCB before the UCB becomes operational. The UCB itself could also initiate or undertake initialization of the memory unit.

Figure 1:
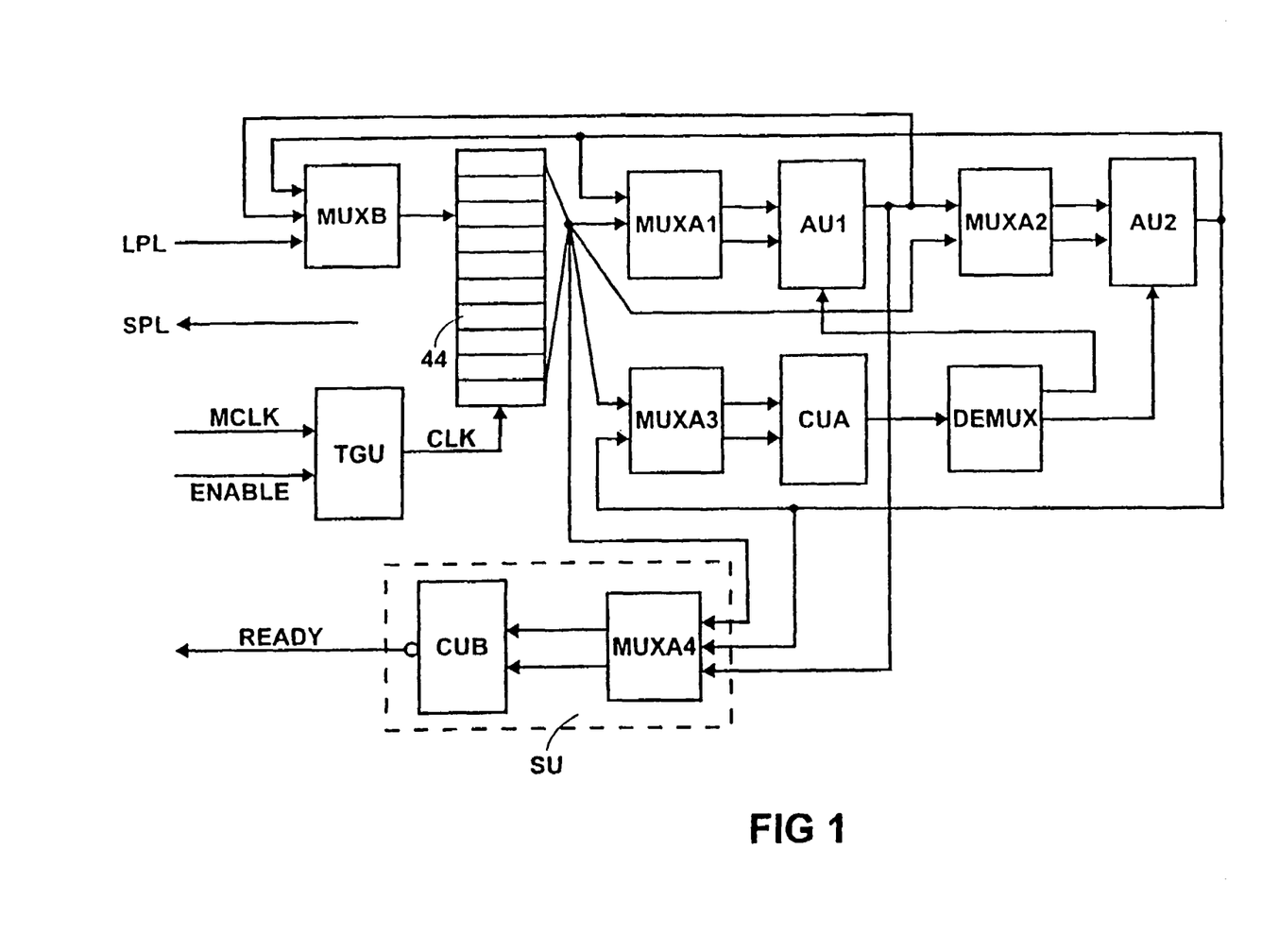
FIG. 1 is a block diagram of the underlying structure of the hardware block according to the invention.

The underlying structure of a UCB is shown in FIG. 1.

The UCB has one or more arithmetic units (AU1, AU2), one or more comparison units of a first type (CUA), one or more multiplexers of a first type (MUXA1, MUXA2, MUXA3), one or more multiplexers of a second type (MUXB), one or more demultiplexers (DEMUX), one or more timer generation units (TGU), and one or more signaling units (SU), where the signaling unit (SU) in the present example includes a multiplexer of the first type (MUXA4) and a comparison unit of a second type (CUB).

In the present example, the arithmetic units (AU1, AU2) have two input interfaces, one output interface, and one control interface. The arithmetic units (AU1, AU2) are responsible for arithmetic and/or logical processing of input signals arriving via their input interfaces. The operations that are executable by the arithmetic units (AU1, AU2) can be fixed or individually set (configurable). In particular, these include arithmetic operations such as addition, subtraction, multiplication, division, etc., logical operations such as AND operations, OR operations, inversion, complementation, etc., arithmetic and logical shift operations, and data transfers (through-connecting one of the incoming signals to the output interface). The arithmetic units (AU1, AU2) are not equivalent to arithmetic/logic units (ALUs) in conventional, program-controlled units such as microprocessors, microcontrollers, etc.; the number of operations they can execute is restricted, so that the structure of the arithmetic units (AU1, AU2) can remain comparatively simple. The control interface for the arithmetic units (AU1, AU2) can be used to define whether or not the arithmetic unit concerned should execute the operations for which it is intended. This allows the practical implementation of instructions whose execution is dependent on the presence of a specific condition. For example, the condition may be the status of a specific flag: if the flag is set, then the task for which the arithmetic unit concerned is responsible is executed (an addition, for example), and otherwise it is not (or vice versa). Instructions of this type, subsequently referred to as "conditional instructions", make it possible to eliminate conditional jump instructions, which are difficult to use. These instructions are described in greater detail later.

The comparison unit of the first type (CUA) has two input interfaces and one output interface in the present example. The comparison unit (CUA) is responsible for submitting the signals or data arriving at its input interfaces to comparison operations. The operations that are executable by the comparison units (CUA) can be fixed or individually set (configurable). For example, these include greater than, greater than or equal to, smaller than, smaller than or equal to, equal to, and not equal to comparisons, as well as checks for TRUE and FALSE. The output interface of the comparison unit (CUA) is connected to the control interfaces of the arithmetic units (AU1, AU2) via the demultiplexer (DEMUX), which is described in greater detail below. Whether or not the arithmetic units (AU1, AU2) execute the operation they are intended to execute, is dependent on the result of the operation executed in the comparison unit (CUA).

The multiplexers of the first type (MUXA1, MUXA2, MUXA3 and MUXA4), the multiplexer of the second type (MUXB), and the demultiplexer (DEMUX) are used to select the data and/or signal sources and the data and/or signal destinations. More specifically:

The multiplexer MUXA1 is used to select the sources of data and/or signals supplied to the input interfaces of the arithmetic unit AU1 (in the present example, possible data and/or signal sources are the register file (44) and other arithmetic units).

The multiplexer MUXA2 is used to select the sources of data and/or signals supplied to the input interfaces of the arithmetic unit AU2 (in the present example, possible data and/or signal sources are the register file (44) and other arithmetic units).

The multiplexer MUXA3 is used to select the sources of data and/or signals supplied to the input interfaces of the comparison unit CUA (in the present example, possible data and/or signal sources are the register file (44) and other arithmetic units).

The multiplexer MUXA4 is used to select the sources of data and/or signals supplied to the input interfaces of the comparison unit CUB (in the present example, possible data and/or signal sources are the register file (44) and other arithmetic units).

The multiplexer MUXB is used to select the sources of data and/or signals supplied to the register file (in the present example, possible data and/or signal sources are the arithmetic units, the register file itself, and the external hardware (via a so-called load/store pipeline or LPL/SPL in the present example)).

The demultiplexer DEMUX is used to select the destination or destinations of data and/or signals output by the comparison unit CUA (in the present example, possible data and/or signal destinations are the arithmetic units).

Multiplexers of the first type have a number of input interfaces and two output interfaces. The multiplexer of the second type has a number of input interfaces and one output interface. The demultiplexer has one input interface and a number of output interfaces.

The multiplexers and the demultiplexer have control interfaces that are not shown in FIG. 1. These control interfaces are used to specify which input data and/or signals are through-connected to which output interfaces. The number of control interfaces depends on the number of different assignment combinations required. In the case of 32 input interfaces and two output interfaces, for example, 10 control interfaces are required to be able to through-connect signals and/or data from any input interface to any output interface. If the UCB is used as functional unit (42) in an >S<puter, as shown in FIG. 3, then the control-signal interfaces are preferably connected to the programmable structure buffer (41), so that the configuration data written in it can generally be used directly for multiplexer control. Ideally, the configuration data stored in the programmable structure buffer (41) will also include configuration data to define the relevant function of the arithmetic units (AU1, AU2), the comparison units (CUA, CUB), the timer generation unit (TGU), and/or the signaling unit (SU).

As a result of the arithmetic units (AU1, AU2), the comparison unit of the first type (CUA), the multiplexers of the first type (MUXA1, MUXA2, MUXA3), the multiplexer of the second type (MUXB), and the demultiplexer (DEMUX), the UCB is in a position to read stored data from a memory unit (in the register file 44), to process the data arithmetically and/or logically, and to write the data representing the result of this processing to the memory unit (register file 44).

As mentioned at the outset, the UCB is also in a position to interact autonomously with external hardware. In the present example, this interaction means that:

in response to specific events, the UCB can instruct the memory unit to accept data supplied by the external hardware; and the UCB can output data and/or signals to the external hardware.

In the present example, external hardware consists of other UCBs, and/or a control unit operating in parallel or at a supervisory level, and/or other components of the system containing the UCB (e.g. sensors, A/D converters, D/A converters, timers, interrupt controllers, devices to be controlled, etc.).

Figure 2:
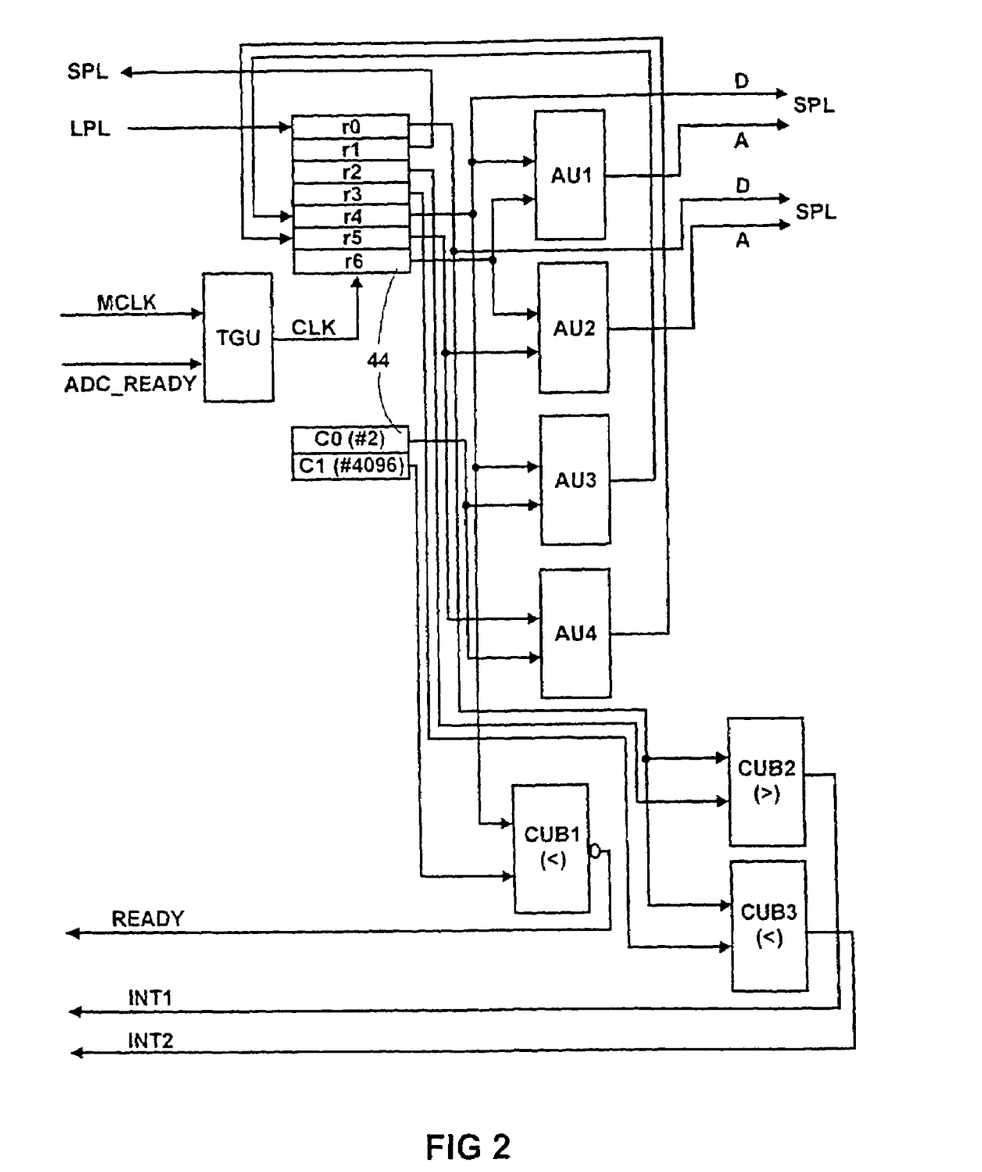
FIG. 2 is a block diagram of the hardware block of FIG. 1 in a format that has been structured for a specific application.

Interaction between the UCB and the external hardware is generally (but not exclusively, as shown in FIG. 2) effected by the timer generation unit (TGU), of which there should be at least one, and the signaling unit (SU), of which there should be at least one.

The timer generation unit (TGU), of which there should be at least one, and the signaling unit (SU), of which there should be at least one, represent an interface to the external hardware. As explained subsequently in greater detail, they can allow the UCB to interact autonomously with the external hardware (without intermediate switching by a control unit operating at a supervisory level).

Based on signals and/or data that originate from inside and/or outside the UCB, the timer generation unit (TGU) is responsible for generating a periodic or non-periodic clock signal. In the present example, the input signals are a periodic master clock (MCLK) from the system containing the UCB and an enable signal (ENABLE) from an external hardware component, with which the UCB has to co-operate. In principle, however, any number of input signals originating from any sources can be used to generate the clock signal. In order to increase flexibility, a multiplexer could be series-connected on the input side of the timer generation unit (TGU). It would then be possible to select the input signals supplied to the timer generation unit from a large number of potential input signals, depending on the application. In the present example, the clock signal (CLK) generated by the timer generation unit (TGU) is used as the clock signal for a memory unit that is represented by the register file (44) in the present example. In this case, the register file is configured to write data and/or output data using cycles provided by the clock signal.

This allows the following:

data that is supplied directly or indirectly (via the aforementioned load/store pipeline (LPL/SPL), for example) by external hardware (by an A/D converter, for example) can be transferred to the register file (44) using the cycle of the clock signal provided by the timer generation unit, i.e. at precisely defined times, (for example on receipt of a signal ADC_READY, signaling the conversion end of the conversion by the A/D converter); and/or data that is stored in the register file (44) can be output directly or indirectly (via the aforementioned load/store pipeline (LPL/SPL), for example) to external hardware (to an external memory unit such as the data cache (5) in the >S<puter shown in FIG. 3, for example).

In the present example, the signaling unit (SU) comprises a multiplexer of the first type (MUXA4) and a comparison unit of the second type (CUB). Based on signals originating from inside and/or outside the UCB, the signaling unit is responsible for generating signals that indicate one or more states or events, and are subsequently referred to as report signals. In the case of the UCB shown in FIG. 1, only one report signal is generated. This one report signal is the output signal of the comparison unit CUB, which compares the two output signals of the multiplexer (MUXA4) that is series-connected on the input side of the comparison unit (CUB). Thanks to the multiplexer (MUXA4), the signals to be used as a basis for report signals in the context of a specific application, can be selected from a large number of signals that could be used for this purpose. In the present example, the signals to be used as a basis for report signals include an output signal from the arithmetic unit (AU2) and an output signal from the register file (44). In addition or as an alternative, any other signals can be used as a basis for generating report signals.

The report signal or report signals generated by the signaling unit are used to signal specific states or events to external hardware. For example, a READY signal could indicate the end of execution for the operations to be executed by the UCB. If the operations to be executed by the UCB are also operations that have to be executed while running a repeated loop, then the report signal can also signal the end of the loop sequences that have to be performed. Among its other uses, the comparison unit (CUB) can also be used as a loop counter, in order to indicate when the operations to be executed by the UCB have been executed as many times as the number of loop sequences that have to be performed. The report signals can also be used as interrupt requests.

The comparison unit (CUB) is almost identical to the comparison unit of the first type (CUA). Essentially, the "only" difference is that the standard setting of the output signal level can be FALSE, and the standard setting of the output signal level can be configured, preferably to suit the specific application.

The UCB shown in FIG. 1 and described with reference to FIG. 1 is only intended to explain the underlying structure. In practice, there would be many more arithmetic units, comparison units, multiplexers, demultiplexers, and even timer generation units and signaling units, than is the case in the example shown in FIG. 1. The UCP is preferably dimensioned so that all operations to be effected by a so-called hyperblock, which is described in greater detail later, can normally be programmed into it at the same time.

The data and/or signal paths provided in the UCB can consist of individual circuits or buses, where it may be beneficial if the number and/or type of bus circuits to be provided can be configured in the individual components of the UCB or in the bus system.

There are clearly many advantages in a UCB of the type described here, in comparison with conventional, configurable hardware blocks (field-programmable logic circuits).

The first advantage is that the data-linking units of the UCB are in a position to execute more complex operations. This means, at least to some extent, a move away from logical links that are table-oriented or based on DNFs (disjunctive normal formats). One or even several arithmetic-logical links can be implemented per arithmetic unit (AU).

The operations that can be executed in the UCBs (their arithmetic units) are also more extensive (more approximately blocked) than in the case of FPGAs (field-programmable gate arrays), for example. Therefore, the operations that can be executed by individual arithmetic units can be more quickly, easily and reliably reconciled with the actions to be effected by instructions or algorithms for program-controlled units. As a result, programs or program sections to be executed in program-controlled units can be implemented as configuration data with a minimum of effort, and the UCB can be configured in such a way that its use results in performance of the actions to be effected by processing the corresponding program or program section.

As mentioned at the outset, UCBs are also characterized by their ability to interact autonomously with external hardware. It can be advantageous, particularly in the case of connections to computing units, if the connection to the external hardware is provided at least partly via the so-called load/store pipelines.

It is also advantageous if the element that synchronizes the UCB, namely the memory unit (register file (44) in the present example), includes connections to the external hardware.

Hardware blocks of the type shown in FIG. 1 can be and are preferably configured on the basis of instructions or instruction sequences. If instructions or instruction sequences are implemented in corresponding hardware-block structures, then the correspondingly configured hardware block can be used as a process unit for sequential instruction sequences. This type of hardware-block configuration is also referred to subsequently as structure-procedural programming.

The starting point for structure-procedural programming can be a program written in a high-level language such as C, C++, etc. This program is translated by a compiler, and the resulting code is converted into structure information (preferably based on hyperblocks). The relevant hardware block can then be configured on the basis of this structure information. The hyperblock is described in greater detail subsequently.

Of course, the starting point for structure-procedural programming could also be a program written in assembler or other language. By the same token, there is no restriction on the programming method used (functional, imperative, object-oriented, etc.).

It is clearly advantageous if the code to be converted into structure information, i.e. the machine instructions generated by the compiler or by other means, mainly consists of just five types of machine instructions, namely unconditional instructions, conditional instructions, predicate instructions, loopxx instructions, and intxx instructions. In general, this will then allow the formation of particularly long instruction blocks (blocks containing a particularly high number of instructions), with just one entry point and one exit point. The ability to generate instruction blocks of maximum length and with just one entry point and one exit point is very significant, because instructions belonging to the same instruction block, indeed only such instructions, can be handled as one unit (as a macro-instruction comprising a number of instructions), which can be implemented in a common hardware-block structure and executed in a single operation. If the configuration of a hardware block is based on exactly one such unit in each case (and if the hardware block is big enough to be configured in this way), then the number of hardware-block restructurings or reconfigurations required to process a program can be reduced to a minimum. These instruction blocks, whose generation is now favored, and whose creation is also possible due to the aforementioned instruction groups, are the hyperblocks mentioned above.

A particular characteristic of hyperblocks is that conditional jump instructions are eliminated by applying the so-called if-conversion described in greater detail below.

The following references provide further details about hyperblocks, other instruction blocks, and related topics:

Wen-Mei W. Hwu et al.: "Compiler Technology for Future Microprocessors", Invited Paper in Proceedings of the IEEE, Vol 83 (12), December 1995, Special Issue on Microprocessors, Pages 1625 to 1640;

Henk Neefs, Jan van Campenhout: "A Microstructure for a Fixed Length Block Structured Instruction Set Architecture", Proceedings of the Eighth IASTED International Conference on Parallel and Distributed Computing and Systems, Pages 38 to 42, IASTED/ACTA Press, 1996;

Richard H. Littin, J. A. David McWha, Murray W. Pearson, John G. Cleary: "Block Based Execution and Task Level Parallelism", in: John Morris (Ed.), "Computer Architecture 98", Proceedings of the $3^{rd}$ Australasian Computer Architecture Conference, ACAC'98, Perth, 2–3 Feb. 1998, Australian Computer Science Communications, Vol. 20, No. 4, Pages 57 to 66, Springer, Singapore.

As indicated previously, a hardware block should preferably be dimensioned to allow configuration by the hyperblock, so that whole hyperblocks can always be converted into corresponding hardware block structures where possible.

The unconditional instructions mentioned above are instructions for the unconditional processing of data, including the copying of data from one memory area to another (from one register to another). These instructions are subsequently referred to as normal instructions. They include arithmetic and logical links between data for new values and so-called move instructions for copying register contents. The general format for these instructions is: <mnemonic> <destination register>, <source register 1>, <source register 2>. An arithmetic unit in the hardware block is required to carry out such an instruction.

Conditional instructions are instructions for processing data if a specific condition is satisfied. The actions or operations to be executed by these instructions correspond to the actions or operations that are executable by normal instructions, but execution of the actions concerned is dependent on a predefined condition. If the condition is satisfied, then the action specified by the instruction is executed, otherwise nothing is executed (the relevant instruction works like a NOP instruction in this context). These instructions are subsequently referred to as conditional instructions. The general format for these instructions is: <mnemonic>p <destination register>, <source register 1>, <source register 2> <p-flag>, where the "p" at the end of the mnemonic indicates that the execution of the instruction is dependent on a condition, and the condition is defined by a specific state of a specific flag (the "p" flag). An arithmetic unit in the hardware block is required to carry out the action specified by such an instruction. A comparison unit is required to verify the condition, and its output must be connected to the control input of the arithmetic unit.

Predicate instructions are instructions for establishing the state of the condition flag (p-flag) used in conditional instructions. This is established during program execution, and based on a comparison between two data elements. These instructions are subsequently referred to as pxx instructions. The general format for these instructions is: pxx <source register 1>, <source register 2>, <p-flag>, where xx specifies the compare operation to be performed, and is replaced by gt (greater than), ge (greater than or equal to), eq (equal to), ne (not equal to), le (less than or equal to), or lt (less than). The pxx instructions are comparable with normal branch instructions, and can be used in place of these by applying so-called if-conversion (see the aforementioned article by Wen-Mei W. Hwu et al.)

Loopxx instructions at the end of a hyperblock are used to repeat loops. They trigger a return to the beginning of the hyperblock concerned, provided a condition specified in the instruction is satisfied. If the condition is no longer satisfied, then they trigger the generation of a READY signal by the signaling unit (SU). The condition is defined by a specified result of a compare operation. The general format for these instructions is: loopxx <source register 1>, <source register 2>, where xx specifies the compare operation to be performed.

Intxx instructions are used to generate signals for output to the external hardware. They are a more generalised form of loopxx instructions: they allow signals with any meaning to be output for any reason to any external component of the system containing the UCB. The general format for these instructions is: intxx <source register 1>, <source register 2>, <int_Signal>, where xx specifies the compare operation to be performed, and "int_Signal" specifies the report signal to be generated and output by the signaling unit (SU).

Because the UCB is able to execute all the operations specified by the instruction types listed and explained above, this makes it a component with an exceptionally wide range of uses. This means that many programs or program sections can be executed entirely by the UCB. The UCB can be used to replace a program-controlled unit, partly or completely, or to significantly increase its performance when used as part of a program-controlled unit or co-operating with such a unit.

The following paragraphs explain how the instructions are converted into a corresponding UCB structure (the self-configuration of the UCB from a sequential stream of instructions). Since it is only intended to describe the fundamental principle of the conversion, the following explanations are restricted to the conversion of normal, conditional, and pxx instructions. The other instructions, more specifically the loopxx and intxx instructions, may require special handling in some cases, though this will not present any difficulty once the procedure described below has been understood.

The UCB, and more specifically its components (arithmetic units, comparison units, multiplexers, demultiplexers, etc.) and the connections between these components, is configured using the configuration data (configuration bits) representing the required configuration in the present example. The task of the conversion procedure described below is therefore to generate or modify (preferably predefined) configuration bits, or a bit stream containing these, which are based on the instructions or instruction sequences that are to be used as a basis for the UCB configuration.

In particular, if the sub-units of the UCB are configurable, then logical or virtual units are assigned to these (physical) sub-units, so that the virtual units define the various functions of the physical sub-units. For example, the virtual units adder, subtractor, etc. can be assigned to the physical sub-unit "first arithmetic unit (AU1)", provided this is configurable. A virtual unit is assigned to exactly one physical sub-unit, but a number of virtual units can be assigned to the same physical sub-unit. All virtual units are preferably managed in a table or list. In addition to information about the virtual units themselves, the relevant entries include information about which physical sub-unit the relevant virtual units are assigned to, which configuration bits to use and, if necessary, how this physical sub-unit has to be configured, so that it takes the function represented by the virtual unit.

The conversion of an instruction into UCB structuring information takes place in three main steps.

In the first step, it is first determined what type of virtual unit is required to execute the instruction to be converted (adder, subtractor, multiplier, etc.), and whether such a virtual unit is still available. If a virtual unit of the required type is still available, then it (or one of them) is selected to execute the instruction concerned. Configuration or preparation then takes place, and the physical sub-unit assigned to the selected virtual unit is reserved. Configuration is simply a matter of setting or resetting the configuration bits assigned to the physical sub-unit concerned. This does not present any difficulties, since information about which physical sub-unit the selected virtual unit is assigned to, which configuration bits to use, and, if necessary, how this physical sub-unit has to be configured, is managed together with the virtual unit. It is necessary to reserve the physical sub-unit assigned to the selected virtual unit, so that the physical sub-unit cannot be used more than once. In the present example, this is achieved by locking all the virtual units assigned to a physical sub-unit once the physical sub-unit concerned has been allocated for a specific purpose.

Depending on the structure of the UCB, the p-flag may indicate that a whole comparison unit has to be selected in the case of pxx instructions.

In the case of conditional instructions, the p-flag only affects the choice of virtual/physical unit(s) if specific instructions are only possible with specific flags, i.e. full orthogonality is not available in the instruction subset for conditional instructions.

In the second step of UCB configuration, the multiplexers that are series-connected on the input and/or output side of the selected physical sub-unit are configured, in order to set the data and/or signal sources and the data and/or signal destinations, in accordance with the specifications in the instructions to be converted. Ideally, the multiplexers and the format of the instructions to be converted are matched in such a way that the instruction parts defining the data and/or signal sources and the data and/or signal destinations can be transferred unchanged as the configuration bits used to configure the multiplexer. If, for whatever reason, this is not possible or desirable, then the configuration bits used to configure the multiplexers can be taken from a table, for example, that stores the assignment between the instruction parts defining the data and/or signal sources and the data and/or signal destinations and the configuration bits used to configure the multiplexer. Ideally, the configuration required to create a connection to a specific data and/or signal source and/or to a specific data and/or signal destination should be the same for each multiplexer.

Special handling is required if the underlying data for the operation to be executed consists at least partly of a constant contained in the instruction code. In this case:
 a free (constant) register must be found;
 this register must be used as a data and/or signal source;
 the constant contained in the instruction code must be written into the selected register before the UCB becomes operational.

It is possible to check in advance whether the constant concerned is already stored in a (constant) register. If this check reveals that a (constant) register containing the constant already exists, then this existing (constant) register can be used as a data and/or signal source.

It should also be noted that the instructions to be converted have varying amounts of data and/or signal sources and data and/or signal destinations.

It is worth noting that registers used as a data and/or signal destination are marked as allocated, since a second allocation is not permitted within a hyperblock, and must be prevented by means of so-called (runtime) register renaming, a technology that is familiar from superscalar architectures.

Following this second step (which is the same for all instructions), special sub-steps are inserted for specific instruction types, depending on the special characteristics concerned.

In the case of conditional instructions, among other things, it is necessary to ascertain the presence of the comparison unit that will check the condition, and connect its output signal to the arithmetic unit that will execute the operation, via the associated demultiplexer. The type of condition must also be taken into consideration.

In the case of move instructions, it must also be ensured that the contents of the destination register is not changed if the instruction is not executed.

It is possible to stop after completing the second step of UCB configuration, and start the UCB. However, it is preferable to execute the third step beforehand, as described below.

This third step of UCB configuration is used to implement so-called data forwarding. In this context, the data and/or signal sources are not automatically taken from the data and/or signal sources specified in the instructions. If possible, use is made instead of the physical sub-unit, which previously wrote the data and/or signal source concerned within the relevant hyperblock. This is advantageous for two reasons. Firstly, because it is likely that fewer registers will be required (if the data and/or signal source specified in the instruction is not used as such, then it does not have to be written, and can even be omitted completely if appropriate). Secondly, because the data will be available sooner if it is collected from the sub-unit that generates it (an arithmetic unit, for example), than if it has to be written to a register first and then collected from there.

Data forwarding can be used with all instructions, and represents a huge advantage on average.

To conclude, a practical example of using a UCB is described below.

This example relates to an analog/digital conversion of data. More specifically:
 an A/D converter with a conversion width of 8 bits is started by a timer;
 the result of the A/D conversion is stored together with a 12-bit count marker;
 the result of the A/D conversion is monitored to see whether it rises above or falls below specific limit values, where control branches to a specific routine if these limit values are exceeded;
 the procedure is terminated after 2048 measurements.

Such an application requires relatively high overheads in the case of a pure software solution. Because a typical A/D converter (an A/D converter that is integrated in a microcontroller, for example) does not deliver the result spontaneously, and therefore operates as a so-called flash converter with a conversion time in the region of a few microseconds, one of the following variants must be chosen in order to implement the application specification exactly:

1) The timer triggers an interrupt. The interrupt service routine starts the A/D conversion and is then terminated. The A/D converter likewise triggers an interrupt when conversion is complete. In the interrupt service routine that is executed as a result, the A/D conversion result is read and processed.

2) The timer triggers an interrupt. In the interrupt service routine that is executed as a result, the A/D conversion is started, the system waits for the conversion to be completed, and then (after conversion is complete) the A/D conversion result is read and processed.

If the conversion times are shorter than the interrupt latency times, then the second variant is preferable. Otherwise, the first variant is preferable. However, the following, third variant is generally the most advantageous (at least for execution in a "normal" microprocessor or microcontroller):

3) The timer triggers an interrupt. In the interrupt service routine that is executed as a result, the last A/D conversion result is read, the next A/D conversion is started, and the A/D conversion result that has been read is analyzed.

In this case, however, the A/D conversion result could be read and analyzed earlier than it actually is.

If the A/D conversion result is to be read, analyzed and stored by a UCB, then the UCB should preferably be configured according to the following C program. As will become apparent later, it is therefore possible to perform the reading, analysis and storage of the A/D conversion result immediately after the A/D conversion is complete, with a minimum of overheads and minimum loading on the UCB. A new keyword, namely "hardware_thread", is used in the following C program. This keyword, which can be given another name if preferred, is used to signal to the compiler translating the C program, that it should compile the relevant program or program section in such a way that the generated code can be executed in a UCB as efficiently as possible. The use of such a keyword is not mandatory. It could also be arranged that the compiler automatically compiles the programs for compilation, in such a way that they can be executed in UCBs.

--- int *p_adc, adc_value, upper_limit, lower_limit, adc_ready;
int adc_array(4096);

-continued

```
...
void hardware_thread readAD()
{
  int x = 0;
  while( x < 4096 )
  {
    if( adc_ready == 1 )
    {
      // Access A/D converter
      adc_value = *p_adc;
      // Call the routine out_of_range
      // if the limit value is exceeded
      if( adc_value > upper_limit ||
        adc_value < lower_limit )
        out_of_range();
      // Store the index information
      adc_array[x++] = x;
      // Store the conversion result
      adc_array[x++] = adc_value;
    }
  }
}
```

Using the instruction types specified previously, this source code can be translated into the following assembler code:

```
    mov r1, p_adc        ; Address of the A/D converter -> r1
    mov r4, 0            ; Variable x -> r4
    mov r5, 1            ; x + 1 -> r5
    mov r6, adc_array    ; Memory field address -> r6
    ld r2, upper_limit   ; upper limit value -> r2
    ld r3, lower_limit   ; lower limit value -> r3
L0: ld r0, (r1)          ; A/D conversion result is loaded
    intgt r0, r2, i1     ; Generate report signal INT1
                         ; (interrupt request 1), if r0 > r2
    intlt r0, r3, i2     ; Generate report signal INT2
                         ; (interrupt request 2), if r0 < r3
    st (r6+r4), r4       ; Store count marker
    st (r6+r5), r0       ; A/D conversion result -> r0
    add r4, r4, 2        ; Update x
    add r5, r5, 2        ; Update x+1
    looplt r4, 4096      ; Repeat from L0,
                         ; if r4 < 4096
```

In this example, the first 6 instructions deal with the initialization of registers. Subsequent instructions (starting at the label L0) deal with the execution of actions to be effected by the C program shown here.

Admittedly, the assembler code does not include the condition that the loop should only be executed if the ADC_READY signal is detected. However, if the assembler program is converted into a UCB structure and executed by the UCB, it nonetheless achieves the same result as in the case of "normal" translation and execution of the C program in a conventional microprocessor or microcontroller. The condition that is missing in the assembler code is actually a quasi-trigger, which can also be achieved by the enable signal ENABLE supplied to the timer generation unit (TGU) of the UCB.

By converting the assembler code into a UCB structure that can perform the required actions, the result is the UCB structure shown in FIG. 2.

The UCB shown in FIG. 2 contains four arithmetic units (AU1, AU2, AU3, AU4) configured as adders, one timer generation unit (TGU), and a signaling unit (SU) containing three comparison units (CUB1, CUB2, CUB3). The structure of the UCB is clearly based on the general UCB structure illustrated in FIG. 1; it has merely been adapted to the specific application. The connection of the UCB sub-units and their input and output signals can be taken from FIG. 2 itself, and do not require any further clarification. It is now clear that a UCB configured in this way does exactly what is defined by the above assembler code (the above C program).

It should be clear that a UCB configured in this way can execute the tasks to be processed, both fully independently (without any loading on control units operating in parallel or at a supervisory level) and significantly faster than is possible with a conventional microprocessor or microcontroller.

It should also be clear that use of the UCB is in no way limited to the examples described above. UCBs can obviously be used for countless other purposes. Among other areas, particular emphasis is placed on their potential for use in chip tests or in cryptography and identification applications. UCBs can be used to perform such tasks with particularly low overheads and exceptional flexibility at the same time.

The aforementioned chip tests refer in particular to chip tests conducted using test modules that are packaged in the integrated circuit to be tested, primarily therefore the Memory Build in Selftest (MBIST), Linear Feedback Shift Register (LFSR), Multiple Input Signature Register (MISR), Memory Build in Self Repair (MBISR), analogue BIST (in the case of analogue/digital converters, for example), and On-Chip Monitors (current-measurement monitors for IDDQ, for example), etc. The integrated circuits to be tested may be of any type, for example microprocessors, microcontrollers, memory modules, A/D converters, etc. The aforementioned test procedures and other test procedures, for which special test modules have to be provided in the chip to be tested, are not yet widely used due to the considerable overheads involved in integrating such test modules in the chip to be tested (bigger chip surface, higher production costs, etc.). The use of UCBs to perform the chip test can provide a solution here. The UCB that is used to perform the chip test (i.e. used as a chip-test module) can actually undertake other tasks before and/or after the chip test, for example it can be configured as a serial or parallel interface. The aforementioned or other chip tests can then be performed without the need to provide a special chip-test module in the chip to be tested. Provided the UCB is designed and dimensioned appropriately, the chip test is not restricted in any way; the functionality of the UCB with reference to chip tests can correspond fully to the functionality of special chip-test modules. Chip tests based on the use of UCBs will generally run even faster than chip tests based on the use of special chip-test modules. This is because, for reasons of space and cost, special chip-test modules have the simplest possible structure, which means that it is not always possible to perform chip tests at maximum speed. This is different for if a UCB is used in a chip test. UCBs are automatically designed for universal use, so that they can generally be adapted to the tasks concerned with optimum effect in each case, and without the need for special development. In principle, UCBs can be used to implement any analogue, synchronous digital and asynchronous digital circuit. The use of UCBs for chip tests is also beneficial in that changes can be made to the test procedure at any time without difficulty. Changes may be required to eliminate errors in the test procedure, for example, or to bring the test procedure up to date. The UCB itself, which is used for the chip test, can be tested by a so-called scan test, for example.

Practical tests have already been carried out, in which an MBIST controller for static RAMs was implemented by a UCB. The results were outstanding.

UCBs are also extremely interesting in the context of cryptographic and identification applications, because the circuits implemented by UCBs can be changed at any time without difficulty. In effect, a simple UCB reconfiguration is all that is required to make the necessary changes to identification data and/or cryptographic codes (e.g. following security attack by a hacker), and is quite straightforward. There would be no need to replace the smart cards, mifares, or immobilizers used by the end customer.

Other advantages of using UCBs for cryptographic and identification applications include the fact that UCBs can be reprogrammed more quickly and more frequently than other configurable hardware, such as so-called FPGAs. Furthermore, UCBs are smaller and more surface-efficient than FPGAs.

UCBs can obviously be used for other applications, and, depending on the application type, can perform different functions in different operating phases of the equipment containing the UCB. In this context, the functions performed by the UCB can be adapted to the individual requirements of the user with a minimum of overheads, by specifying the corresponding configuration data or configuration data sequences. There are many possible examples of this. For example, a UCB may be used as a chip-test module after the chip containing the UCB is switched on, and subsequently (i.e. during "normal" operation of the chip) used as either a serial interface or an intelligent parallel interface.

In practice, it can be advantageous for UCBs to have facilities for temporary data buffering. The preferred option for this purpose is to provide memory within the UCB, for example read/write memory (RAM). This memory is preferably designed as random access memory or stack memory, and need only be accessible from the UCB containing it. If required, it is obviously possible to allow other components in the system containing the UCB to access this memory.

The synthesis of UCBs can take place using a circuit description language such as VHDL, for example. The configuration data to configure the UCB as required can be generated on the basis of an assembler program, a C program, or a circuit description (also in a circuit description language such as VHDL).

In summary, the advantages of the hardware block (UCB) described here are many and various. It is more powerful, more flexible, and more universally applicable than conventional hardware blocks of the type under consideration.

We claim:

1. A configurable hardware block, comprising:
a universal configurable unit being selectively configured to read data stored in a memory unit, to process the data in at least one of arithmetic and logical processing units, and to write data representing a result of the processing to the memory unit, said universal configurable unit having an asynchronous combinational circuit to asynchronously link components of said universal configurable unit, and said universal configurable unit interacting autonomously with external hardware.

2. The configurable hardware block according to claim 1, wherein the hardware block is configured for interaction with the external hardware comprising instructing the memory unit to accept data supplied by the external hardware in response to specific events.

3. The configurable hardware block according to claim 1, wherein the hardware block is configured for interaction with the external hardware comprising outputting one of data and signals to the external hardware.

4. The configurable hardware block according to claim 1, wherein the external hardware is selected from the group consisting of other configurable hardware blocks, a control unit operating in parallel or at a supervisory level, and other components of a system containing the configurable hardware block.

5. The configurable hardware block according to claim 4, wherein the data and/or signals output to the external hardware are used to signal specific states or events.

6. The configurable hardware block according to claim 1, which comprises a timer generation unit generating a clock signal for the memory unit.

7. The configurable hardware block according to claim 6, wherein said timer generation unit is configured to generate the clock signal depending on one or more periodic or non-periodic signals originating at least to some extent from the external hardware.

8. The configurable hardware block according to claim 1, which comprises a signaling unit configured to generate report signals for the external hardware.

9. The configurable hardware block according to claim 8, wherein the report signals signal an occurrence of predefined states and/or events in the configurable hardware block.

10. The configurable hardware block according to claim 8, wherein said signaling unit is configured to generate a report signal signaling that an operation or sequence of operations to be executed repeatedly in the hardware block has been executed a specified number of times.

11. The configurable hardware block according to claim 8, wherein the signaling unit is configured to generate a report signal useable as an interrupt request for a program-controlled unit.

12. The configurable hardware block according to claim 8, which comprises at least one comparison unit generating and outputting a report signal.

13. The configurable hardware block according to claim 12, wherein at least some of said comparison units are configurable comparison units configured to subject incoming signals to operations selected from the group consisting of selectable compare operations, checks for TRUE, and checks for UNTRUE.

14. The configurable hardware block according to claim 13, wherein the selectable compare operations are selected from the group of compare operations consisting of greater than, greater than or equal to, not equal to, smaller than, and smaller than or equal to comparisons.

15. The configurable hardware block according to claim 12, wherein at least some of said comparison units have a multiplexer connected in series on an input side thereof, said multiplexer determining which signals are supplied to said comparison unit as input signals.

16. The configurable hardware block according to claim 1, which comprises a plurality of configurable units selected from the group consisting of sub-units selectively configurable to a required function, configurable data paths, and configurable signal paths.

17. The configurable hardware block according to claim 16, wherein configurable data and signal paths to the external hardware exist or can be established.

18. The configurable hardware block according to claim 1, wherein the memory unit is a register block containing a plurality of registers.

19. The configurable hardware block according to claim 1, configurable on a basis of instructions or instruction sequences, and configurable to execute operations or operation sequences specified by the instructions or instruction sequences.

20. The configurable hardware block according to claim 19, dimensioned to be configurable by hyperblock.

21. The configurable hardware block according to claim 1, constructed and configurable to be used to replace a specific circuit.

22. The configurable hardware block according to claim 1, constructed and configurable to be used to replace various specific circuits.

23. The configurable hardware block according to claim 21, configured to test an integrated circuit containing the hardware block.

24. The configurable hardware block according to claim 21, wherein the hardware block is configurable for use in applications selected from the group consisting of cryptography and identification applications.

25. The configurable hardware block according to claim 1, which comprises a memory unit for storing interim results.

* * * * *